May 11, 1965 W. R. KAMINSKI 3,182,446
FLOW CONTROL VALVE
Filed April 12, 1962 2 Sheets-Sheet 1

INVENTOR.
Walter R. Kaminski
BY
Dale A. Winnie
ATTORNEY

May 11, 1965  W. R. KAMINSKI  3,182,446
FLOW CONTROL VALVE
Filed April 12, 1962  2 Sheets-Sheet 2

INVENTOR.
Walter R. Kaminski
BY
Dale A. Winnie
ATTORNEY

United States Patent Office 3,182,446
Patented May 11, 1965

3,182,446
FLOW CONTROL VALVE
Walter R. Kaminski, Ferndale, Mich., assignor to Holley Carburetor Company, Warren, Mich., a corporation of Michigan
Filed Apr. 12, 1962, Ser. No. 187,039
11 Claims. (Cl. 60—35.5)

This invention relates to fluid flow control valves in general and more particularly to air flow control valves for regulating exhaust air flow to obtain a reactionary thrust force.

Aircraft engineers have been working for many years to obtain an air-borne vehicle which will rise vertically and can be made to hover in flight. Aside from the well known helicopter, one means of accomplishing this objective is in the exhausting of large amounts of air downwardly to obtain an upward reactionary force providing sufficient lift to raise and maintain an aircraft in a given flight condition.

It is necessary that this latter type of aircraft be provided with means for maintaining a proper flight attitude during vertical flight and hovering. To this end it has been proposed that reactionary type controls, making use of like reactionary exhaust principles, be provided at wing-tip and fore and aft fuselage positions. Although these attitude controls are normally part of the automatic stabilizing system of the aircraft, as by use of position sensing gyros or the like, it is also necessary that the pilot be able to obtain manual control of the aircraft attitude whenever desired. Furthermore, the manual control means afforded the pilot should provide a control of exhaust air such that the thrust force obtained is proportionate to the linear motion signal from the pilot's stick.

Other requisites in such thrust control means include minimum force feed-back to the pilot's stick, minimum weight and size, reliability, and minimum air pressure loss within the control mechanism.

It is an object of this invention to provide a fluid flow control valve suitable for use as a thrust control by having the exhaust therefrom regulated to obtain a known reactionary thrust force.

In this regard, it is an object of this invention to provide an air flow control valve having a restricted outlet or orifice to obtain such a reactionary thrust force and including means for controlling the air flow exhaust directly at such outlet.

It is another object of this invention to provide an air flow control valve having means of restricting the exhaust air flow to obtain a reactionary thrust force proportionate to a linear control motion.

It is also an object of this invention to provide a thrust control valve having low thrust force feed-back through the control system used therewith.

Still another object of this invention is to provide means for controlling air or gas flow at elevated temperatures for other than aircraft applications and, further, wherein a minimum breakaway force is involved in opening the valve from a fully closed position.

A still further object of this invention, and one incident to low force feed-back and minimum breakaway force, is to provide an air or gas flow exhausting valve mechanism having an extended and convergent annular exhaust passageway with a reciprocal valve member movable through the exhaust passage for closing the same. As will later be more fully appreciated, this arrangement presents a minimum valve area in the flow passage and subject to the forces involved. Further, a useful valve closing force is obtained and contaminates are no problem due to the shearing action between the valve and seating counterpart.

These and other objects and advantages to be gained in the practice of this invention will be more fully appreciated upon a reading of the following specification directed to a preferred embodiment of this invention as shown by the accompanying drawings.

Figure 1:
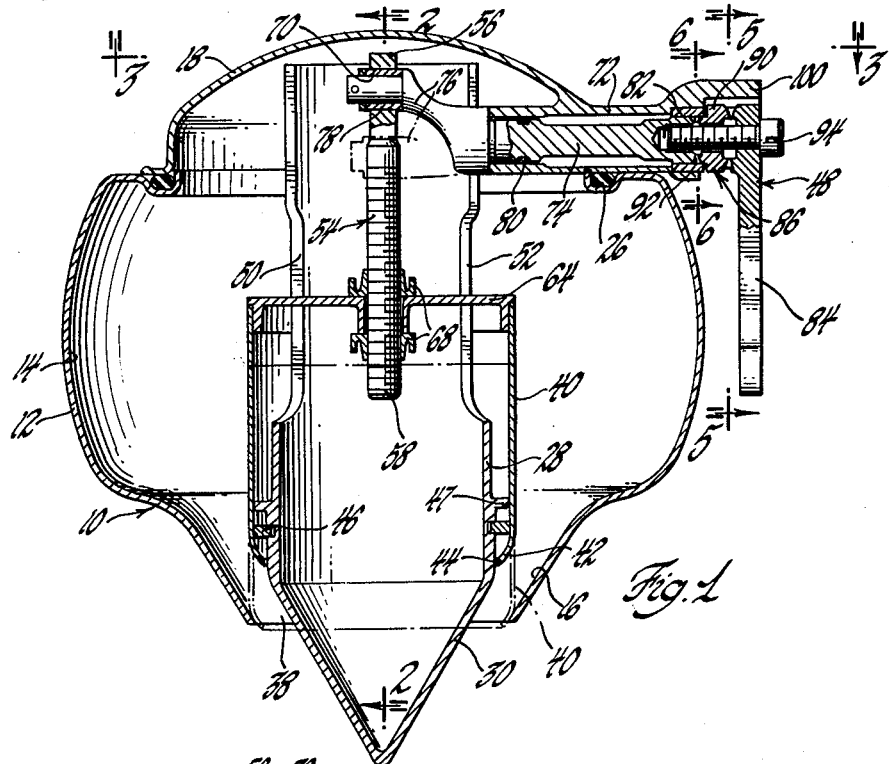
FIGURE 1 is a cross sectional plan view of a thrust control valve embodying the teachings of this invention.
Figure 2:
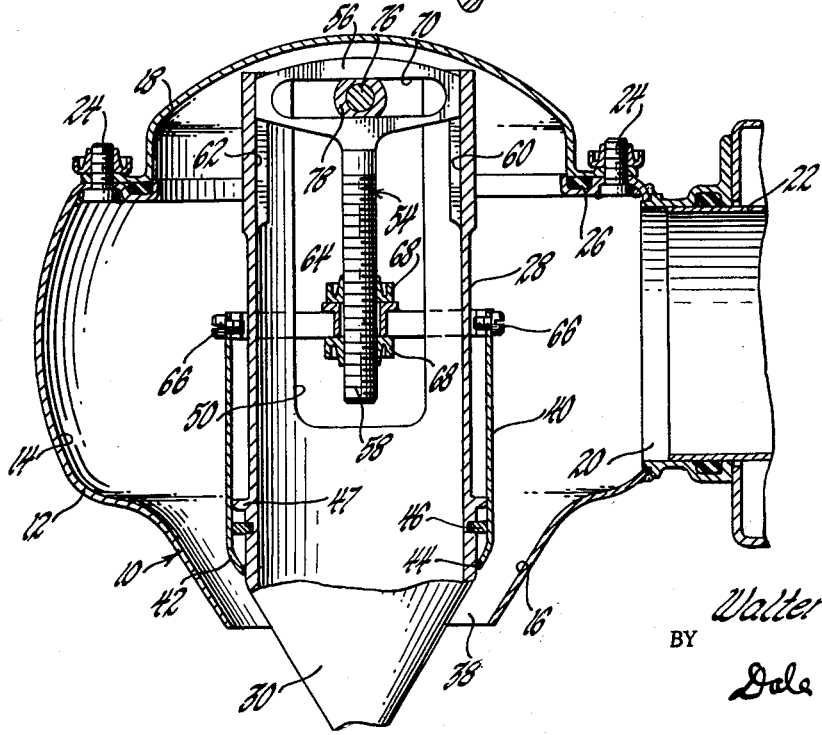
FIGURE 2 is a cross sectional plan view of the thrust control valve shown by FIGURE 1 as seen in the plane of line 2—2 therein and looking in the direction of the arrows.

Referring to the drawings in further detail:

The thrust control valve 10 shown by the drawings includes a spherical body shell 12 formed to provide an internal air chamber space 14. The spherical body shell 12 includes a conical exit opening 16 and has a dome member 18 removably secured opposite thereto. An inlet opening 20 is provided through the spherical body shell 12 and connects with an air flow manifold 22.

The dome member 18 is secured to the body shell 12 by means of threaded bolt fasteners 24. A sealing ring 26 is accommodated between the body shell and dome members to assure against the escape of air from the pressurized air chamber space 14.

A stationary member 28 is secured to the dome 18. It is cylindrical in cross section and is axially aligned and extended towards and through the exit opening 16 of the body shell member 12. The stationary member 28 is formed to include a conical end portion 30 which is disposed concentrically within and extends through the exit opening 16. The upper end of the stationary member 28 is formed to include suitably inwardly disposed flanges 32 having tapped holes 34 therethrough receptive of threaded bolt fastener means 36 securing the stationary member to the dome member 18 (reference FIGURES 3 and 4).

The stationary member may be axially adjusted, and accordingly the conical end portion 30 thereof more suitably positioned within the conical exit opening 16, by means of shims (not shown) between dome member 18 and flange 32. Adjustment by shimming would make it possible to limit the maximum thrust force.

The concentric disposition of the cone end portion 30 of the stationary member 28 within the conical exit opening 16 in the spherical body shell 12 produces a convergent annular exhaust passageway 38. The body shell walls forming the exit opening 16 and the conical end portion 30 of the stationary member 28 are contoured so that the passageway 38 forms a slightly converging nozzle with an extended throat section having a relatively constant area between the entrance and exit ends thereof. Any area change which is introduced into the exhaust passageway 38 is principally to vary airflow through the valve hence decreasing the reactionary thrust force.

The thrust force resulting from the exhaust of air through the passageway 38, and imposed upon any structure having the thrust valve of this invention mounted thereon, is equal to the momentum force of the exhausted air stream. Accordingly, a great thrust force is obtained when the exhaust passageway 38 is unobstructed than when it is restricted in some manner.

Restriction of the exhaust passageway 38 is obtained by use of a cylindrical valve member 40 which is disposed concentrically about the stationary member 28 and is reciprocal from a position closing the exhaust passageway 38 to a position totally removed therefrom. The valve member 40 is provided with an end 42 formed to the contour of the throat walls and includes a terminal end face 44 for sliding or shear engagement with the cone end portion 30 of the stationary member. A sealing ring 46 is provided on the stationary member 28 and disposed for engagement with the inner peripheral face of the cylindrical valve member 40 to minimize air pressure loss therebetween. A shoulder 47 is provided near the conical end of the member 28 for guiding support of the free end of the valve member in the course of valve use.

The cylindrical valve member 40 is formed to include the throat contoured end 42 both to assure stiffness and to prevent warping at elevated temperatures; as well as to match the contour of the shell wall formed in the exit opening 16 and serving the function of a valve seat. The piston ring seal 46 acting as a dirt shearing member and enables the valve to operate in contaminated air. Any contaminants adhering to the sliding surface will be removed in the course of the shearing action incident to operation of the valve.

The cylindrical valve member 40 is reciprocated back and forth across the exhaust passageway 38 by control means 48 provided through the dome member 18 and engaged with the valve member.

The stationary member 28 is cylindrical in cross section, as mentioned, and is adapted to receive part of the control means 48 therewithin. The sidewalls of the stationary member 28 are relieved on diametrically opposite sides, as at 50 and 52 to permit engagement between the control means 48 and valve member 40.

The control means 48 includes a Scotch yoke arrangement with a reciprocal member 54 having a guide head 56 and an elongated threaded shank 58. The guide head portion 56 is received within cooperatively disposed guide slots 60 and 62 provided in the internal side walls of the stationary member 28. This arrangement is to assure axial reciprocation of the threaded shank member 58 within the stationary member 28.

A suitable cross bar member 64 is positioned on the threaded shank 58 of the reciprocal member 54 and has the arms thereof extended through the side wall openings 50 and 52 provided in the stationary member 28 for engagement with the valve member 40. Suitable fastener means 66 are used to secure the ends of the cross bar member 64 to the upper end of the valve member 40 which may include a stiffener ring as shown. A lock nut arrangement 68 is provided on the threaded shank 58 to secure the cross bar member 64 in a selected position.

The guide head member 56 will be noted to include an elongated cam slot 70. This slot arrangement is to enable cam operating engagement with the reciprocal member 54 and actuation thereof and of the valve member 40 engaged thereto.

Figure 3:
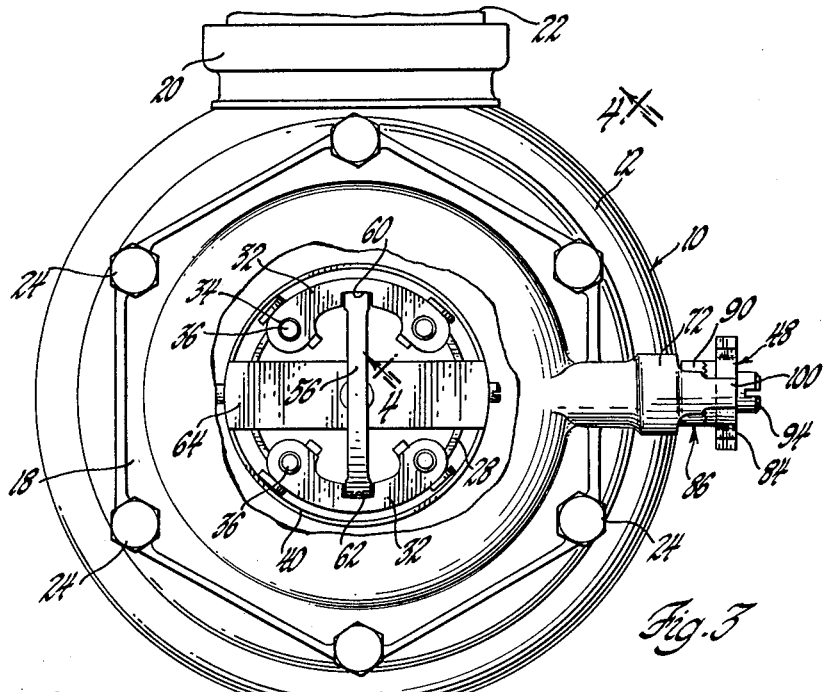
FIGURE 3 is a top view of the thrust control valve shown by FIGURE 1 as seen in the plane of line 3—3 therein and looking in the direction of the arrows. A fragmentary part of the housing shell is cut away in this view to better show certain internal mechanism.
Figure 4:
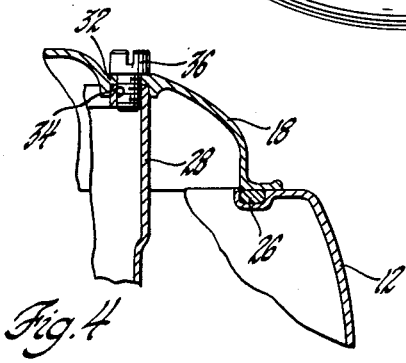
FIGURE 4 is a cross sectional and fragmentary view of a detail feature as seen in the plane of line 4—4 in FIGURE 3 and looking in the direction of the arrows.

Referring to FIGURES 1 and 3, the dome member 18 will be noted to include a passage providing portion 72 formed integrally therewith. This passage forming member 72 is radially disposed and is of sufficient length to provide a good journal bearing surface for a part of the control means 48 extending therethrough for actuating engagement with the reciprocal member 54.

A rotatable member 74 is journalled within the passage forming member 72 and is formed to include a crank arm end 76 having a roller 78 provided thereon and received within the elongated slot 70 provided in the guide head 56 of the reciprocal member 54. As will be appreciated, rotation of member 74 will cause the crank arm end 76, acting within the elongated slot 70, to actuate the reciprocal member 54. The guided arrangement of the reciprocal member 54 within the stationary member 28 assures axial motivation of the reciprocal member 54 and corresponding straight line actuation of the valve member 40 engaged thereto.

A suitable sealing ring 80 is provided within the journal bearing surface of the rotatable member 74 at its inner end to preclude air pressure losses through the passage forming member 72. A journal bearing member 82 is provided within the outer end of the passage forming member 72 for journal bearing support of the rotatable member 74 received therethrough and, although not shown, a like bearing may be provided at the inner passage end, if desired.

The rotatable member 74 is actuated by the crank or lever arm 84 provided on the outer disposed end thereof through a dutchman bevel gear connection 86. This bevel gear connection 86 includes a bevel gear face 88 provided on the lever arm 84 and engaging a gear member 90 having one side formed to include a bevel gear face mating with that provided on the lever arm and the other side formed to include a bevel gear face mating with a cooperative bevel gear face 92 provided on the end of the rotatable member 74. The lever arm 84 is held in engagement with the rotatable member 74 by means of a bolt fastener 94.

Figure 5:
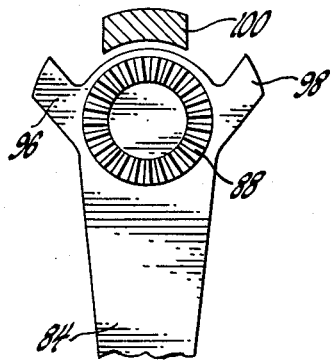
FIGURE 5 is an enlarged cross sectional view of a part of the valve operating mechanism as seen in the plane of line 5—5 in FIGURE 1 and looking in the direction of the arrows.
Figure 6:
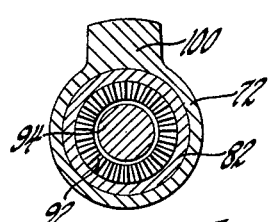
FIGURE 6 is another enlarged cross sectional view of a part of the control mechanism as seen in the plane of line 6—6 in FIGURE 1 and looking in the direction of the arrows.

Referring to FIGURE 5, the lever arm member 84 is shown to include stop ears or tabs 96 and 98 disposed for engagement with a stop member 100 extended from the dome passage member 72. This arrangement prevents undue rotation of the lever arm and consequent valve damaging actuation of the valve member 40 through the control means 48.

*Operation and detailed characteristics*

As will be appreciated, the input motion to the thrust control valve 10 is through a connection between the crank or lever arm 84 and the pilot stick (as used for the aircraft purposes first mentioned). The input motion is a linear stroke which causes the lever arm 84 to rotate through a given angle. This causes the cam-roller linkage, via the crank arm 76 on the end of the rotatable member 74, to generate the required linear motion along the axis of the valve through the Scotch yoke connection therewith and is preferred though, of course, member 74 could be rotated by various other angular or rotary means. The roller member 78 on the end of the crank arm 76 acts within the cam slot 70 to cause axial reciprocation of the control member 54 and the valve member 40 engaged thereto. The guide head or yoke 56 of the reciprocal member 54 is suitably guided within the receptive slots 60 and 62 provided within the upper end of the stationary thrust cone member 28 to assure such axial straight line movement.

The stationary or thrust cone member 28 is secured to the domes member 18 and, in addition to providing the annular exhaust passageway 38, serves as a guide for the movable metering valve member 40. As will be appreciated, the extent to which the valve member 40 is disposed within the exhaust passageway 38 determines the amount of thrust developed by the expanding air exiting through the throat area.

The minimal area of the throat contoured end 42 of the valve member 40 provides a very small pressure force area and accordingly an extremely small force feed back through the valve incident to air pressure forces acting thereon during the exhaust of air through the passageway 38. The nature of the unbalanced force is such that it is essentially constant and unidirectional. It may be nullified by a low rate spring but is of such character as is best retained to give the operator some feel of the valve operation.

As mentioned, the thrust valve 10 of this invention may be operated in contaminated air without concern since the piston ring seal 46 of the valve member precludes contaminants adhering to the sliding surfaces.

The maximum thrust developed by the thrust valve 10 is dependent upon the area of the exhaust passageway 38 when the valve is fully open. This in turn depends upon the relative position of the cone end 30 of the stationary member 28 within the conical exit opening 16 of the housing shell 12. The thrust cone end 30 is adjustable by shims (not shown) placed between the dome 18 and the end of the stationary member 28 engaged thereto. Further airflow adjustment corresponding to the maximum thrust setting is obtained by adjusting the lock nut arrangement 68 securing the control means 48 to the valve member 40. This will enable the passage intercepting end of the valve member 40 to be adjusted to provide the proper air flow area.

The non-linearities between the motion of the input lever 84 and axial movement of the valve member 40 which change the metering area are compensated for in the Scotch yoke mechanism and the amount of offset of the cam follower roller with respect to the crank arm centerline. The amount of offset is selected by proper selection of the dutchman bevel gear mechanism provided between the lever arm member 84 and the rotatable control member 74.

The thrust control valve 10 of this invention provides a means of controlling exhaust air to obtain a thrust force proportional to the input lever motion. It has an inherent low force feed back at the input lever and has a theoretically zero break away force from the closed position. In addition, it has a high thrust efficiency at the wide open condition.

It will be appreciated that while a preferred embodiment of this invention has been shown and described, certain modifications and improvements are within the scope and teaching of this disclosure. Accordingly, such modifications and improvements as are within the spirit of this invention and are not specifically excluded by the hereinafter appended claims are to be considered as inclusive thereunder.

I claim:

1. A thrust control valve, comprising: an air chamber member including a spherical shell having a conical exit opening provided therein and a removable dome member disposed opposite thereto, a member secured to said dome and extended through said exit opening, said last mentioned member including a conical portion disposed concentrically within said conical exit opening and forming an extended conical and annular passageway therewith, a cylindrical valve member guided on said dome secured member and reciprocal from a position extended across and closing said passageway at the outer end thereof to a position removed from said passageway at the inner end thereof, and control means extended through said dome member and engaged with said valve member for metered reciprocation thereof.

2. The thrust control valve of claim 1: said valve control means including a reciprocal member guided within said dome secured member and having said valve member adjustably secured thereto, an operator member rotatably supported in said dome member and having a crank arm provided within said shell and engaged with said reciprocal valve engaged member, and a lever arm secured to the other end of said operator member externally of said dome member.

3. A thrust control valve, comprising: a spherical shell having an air flow collection chamber provided therein, a conical exit opening provided within said shell, a removable dome member forming part of said shell and disposed opposite said exit opening, a stationary member secured to said dome member and axially aligned with said exit, said stationary member including a conical end portion disposed concentrically within said conical exit opening and forming a convergent annular exhaust passageway therewith, a cylindrical member disposed concentrically about said stationary member and reciprocal from a position extended across and closing said passageway at the outer end thereof to a position removed from said exhaust passageway at the inner end thereof, said cylindrical member being formed for sheer engagement with said stationary member in the course of retraction from said passageway, and control means provided through said dome member and within said stationary member for reciprocation of said cylindrical member and metered restriction of air flow through said exhaust passageway productive of a reactionary thrust force.

4. The thrust control valve of claim 3: said stationary member having a hollow mid-section closed at said conical end portion and the side walls thereof relieved in part for engaging said control means to said cylindrical member therethrough, said control means including a reciprocal member guided within said stationary member for axial movement, axially adjustable means securing said cylindrical member to said reciprocal member, a rotatable member journalled within said dome member and formed to include a crank arm extended within said stationary member for actuating engagement with said reciprocal member, and a lever arm member provided on the other end of said rotatable member externally of said dome and responses to linear control actuation.

5. The thrust control valve of claim 4: said reciprocal member including a head portion guided within said stationary member and having a cam slot receptive of said crank arm in engagement therewith, and a dutchman bevel gear connection provided between said lever arm member and said rotatable member for straight line motion translation between said lever arm and said passage closing valve member.

6. A thrust control valve, comprising; a fluid receptive chamber forming member open at opposite ends and having an inlet opening provided through a side wall thereof, said chamber forming member having means secured to one end for closure thereof and having the other end thereof formed to provide an exhaust orifice, and adjustable means operatively secured to and supported on said closed end and extended through said chamber forming member and in concentric spaced relation through said exhaust orifice for selective restriction of the latter, said adjustable means including a stationary member secured to said closure means and having a conical end extended in concentric spaced relation through said exhaust orifice and providing an annular exhaust passage therewith, and a sleeve valve guided on said stationary member and disposed to close said annular exhaust passage.

7. The thrust control valve of claim 6 having operative means provided through said closure means and within said stationary member for actuation of said sleeve valve.

8. The thrust control valve of claim 6, said stationary member having the conical end thereof closed and including means for limited axial adjustment relative to said closure means for selective restriction of the annular exhaust passage formed thereby.

9. The thrust control valve of claim 7 having said stationary member formed to include a cylindrical bore and slotted side walls, and means guided within said bore and connected to said operative means and to said sleeve valve through said slotted side walls for actuation of the latter.

10. A fluid flow control valve, comprising; a fluid receptive chamber housing member having an inlet opening formed through a side wall thereof and an outlet opening formed through an end wall thereof, means provided in said housing and secured to the end wall thereof opposite said outlet opening and extended concentrically through said outlet opening for providing an annular exhaust port therefrom, valve means guided on said last mentioned means and reciprocal relative to said annular exhaust port, and means operatively extended into said housing member and engaged to said valve means for actuation thereof and selective restriction and closure of said exhaust port as a consequence thereof.

11. A fluid flow control valve as provided by claim 10, said housing having the end wall thereof opposite said outlet opening being separable therefrom and carrying therewith said annular port forming means, valve means and valve operating means.

References Cited by the Examiner

UNITED STATES PATENTS

| | | | |
|---|---|---|---|
| 1,752,439 | 4/30 | Larner | 137—219 |
| 2,408,099 | 9/46 | Sherman | 60—35.6 |
| 2,509,238 | 5/50 | Martin | 60—35.6 |
| 3,060,957 | 10/62 | Richards | 137—219 |

FOREIGN PATENTS

| | | |
|---|---|---|
| 372,048 | 5/32 | Great Britain. |
| 610,143 | 10/48 | Great Britain. |
| 797,189 | 6/58 | Great Britain. |
| 1,152,740 | 9/57 | France. |

SAMUEL LEVINE, *Primary Examiner.*

ISADOR WEIL, ABRAM BLUM, *Examiners.*